(12) United States Patent
Lahiri et al.

(10) Patent No.: US 7,194,589 B2
(45) Date of Patent: Mar. 20, 2007

(54) REDUCING DISK IO BY FULL-CACHE WRITE-MERGING

(75) Inventors: Tirthankar Lahiri, Santa Clara, CA (US); Juan R. Loaiza, Redwood City, CA (US); Richard L. Frank, Naples, FL (US); Kiran Goyal, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 10/645,987

(22) Filed: Aug. 22, 2003

(65) Prior Publication Data

US 2005/0044311 A1 Feb. 24, 2005

(51) Int. Cl.
*G06F 13/00* (2006.01)

(52) U.S. Cl. .................. 711/156; 711/162; 711/165

(58) Field of Classification Search ............... 711/156, 711/162, 165
See application file for complete search history.

(56) References Cited

U.S. PATENT DOCUMENTS

| 5,276,662 A | * | 1/1994 | Shaver et al. .................. 711/4 |
| 6,339,811 B1 | * | 1/2002 | Gaertner et al. ............. 711/112 |
| 6,907,499 B2 | * | 6/2005 | Herbst et al. ............... 711/112 |

OTHER PUBLICATIONS

Acharya, A. et al., "Tuning the Performance of I/O-Intensive Parallel Applications", *Proceedings of the 4th Workshop on I/O in Parallel and Distributed Systems*, ACM Press, 1996, pp. 15-27, USA.

Bagrodia, R. et al., Parallel Simulation of Parallel File Systems and I/O Programs, *Proceedings of the 1997 ACM/IEEE Conference of Supercomputing(CDROM)*, ACM Press, 1997, pp. 1-16.

Bordawekar, R. et al., "A Model and Compilation Strategy for Out-of-Core Data Parallel Programs", ACM SIGPLAN Notices, *Proceedings of the 5th ACM SIGPLAN Symposium on Principles and Practice of Parallel Programming PPOPP*, 1995, vol. 30, Issue 8, pp. 1-10.

Bordawekar, R. et al., Automatic Optimization of Communication in Compiling Out-of-core Stencil Codes, *Proceedings of the 10th International Conference on Supercomputing*; ACM Press, 1996, pp. 366-373, USA.

Bordawekar, R. et al., "Communication Strategies for Out-of-Core Programs on Distrbuted Memory Machines", *Proceedings of the 9th International Conference on Supercomputing*, ACM Press, 1995, pp. 395-403, Spain.

Bordawekar, R. et al., "Design and Evalution of Primitives for Parallel I/O", *Proceedings of the 1993 ACM/IEEE Conference on Supercomputing*, ACM Press, 1993, pp. 452-461.

(Continued)

*Primary Examiner*—Reba I. Elmore
(74) *Attorney, Agent, or Firm*—Bingham McCutchen LLP

(57) ABSTRACT

An electronic and computerized system that coalesces write operations using a buffer cache which stores data waiting to be written back to a disk of the electronic and computerized system is described. Dirty data blocks with consecutive data block addresses in the buffer cache are coalesced and written to the disk together. The disk head movements for performing the disk IOs are significantly reduced, thereby allowing the electronic and computerized system to maintain a high IO throughput and high peak performance with fewer disks.

41 Claims, 8 Drawing Sheets

OTHER PUBLICATIONS

Bordawekar, R., "Implementation of Collective I/O in the Intel Paragon Parallel File System: Initial Experinces", *Proceedings of the 11th International Conference on Supercomputing*, ACM Press, 1997, pp. 20-27, Austria.

Chen, Y. et al., "Optimizing Collective I/O Performance on Parallel Computers: A Mutisystem Study", *Proceedings of the 11th International Conference on Supercomputing, ACM Press and IEEE Computer Society*, 1997, pp. 28-35, Austria.

Chen, Y., et al., "Automatic Parallel I/O Performance Optimization in Panda", *Proccedings of the 10th Annual ACM Symposium on Parallel Algorithms and Architectures*, ACM, 1998, pp. 108-118, Mexico.

Corbett, P., et al., "The Vesta Parallel File System", *ACM Transactions on Computer Systems*, ACM Press, vol. 14, No. 3, pp. 225-264.

Cortes, T., et al., "Design Issues of a Cooperative Cache with No Coherence Problems", *Proceedings of the 5th Workshop on I/O in Parallel and Distributed Systems, ACM Press*, 1997, pp. 37-46.

Del Rosario, J. et al., "Improved Parallel I/O via a Two-phase Run-Time Access Strategy", *ACM SIGARCH Computer Architecture News*, 1993, vol. 21 No. 5, pp. 31-38.

Dickens, P.,"An Evaluation of Java's I/O Capabilities for High-Performance Computing", *Proceedings of the ACM 2000 Conference on Java Grande*, ACM, 2000, pp. 26-35, USA.

Ferreira, R. et al., "Compiling Object-Oriented Data Intensive Applications", *Proceedings of the 14th International Conference on Supercomputing*, ACM Press, 2000, pp. 11-21, USA.

Gibson et al., "Strategic Directions in Storage I/O Issue in Large-Scale Computing", *ACM Computing Surveys(CSUR)*, ACM Press, 1996, vol. 28 No. 4, pp. 779-793.

Gross, T. et al., "Architecture Implications of High-Speed I/O for Distributed-Memory Computers", *Proceedings of the 8th International Conference on Supercomputing*, ACM Press, 1994, pp. 176-185, U.K.

Harry, M. et al., "The Design of VIP-FS: A Virtual, Parallel File System for High Performance Parallel and Distributed Computing", *ACM SIGOPS operating Systems Review*, ACM Press, 1995, vol. 29 No. 3, pp. 35-48.

Kotz, D. et al., "Dynamic File-Access Characteristics of a Production Parallel Scientific Workload", *Proceedings of the 1994 ACM/IEEE Conference on Supercomputing*, ACM Press, 1994, pp. 640-649.

Kotz, D. et al., "Flexibility and Performance of Parallel File Systems", *SIGOPS Operating Systems Review*, ACM Press, 1994, vol. 30 Issue 2, pp. 63-73.

Kotz, D., "Disk-Directed I/O for MIMD Multiprocessors", *ACM Transactions on Computer Systems(TOCS)*, ACM Press, vol. 15, No. 1, Feb. 1997, pp. 41-74, USA.

Krieger, O. et al., "A Performance-Oriented Flexible File System based on Building-Block Compositions", *Proceedings of the 4th Workshop on O/O in Parallel and Distributed Systems*, ACM Press, 1996, pp. 95-108, USA.

Krieger, O. et al., "HFS: A Performance-Oriented Flexible File System Based on Building-Block Compositions", *ACM Transactions on Computer Systems* (TOCS), ACM Press, vol. 15 No. 3 ACM, 1997, pp. 286-321.

Kurc, T. et al., "Querying Very Large Multi-Dimensional Datasets in ADR", *Proceedings of the 1999 ACM/IEEE Conference on Supercomputing*, ACM Press, 1999, pp. 1-15, USA.

Lee, J. et al., "Active Buffering Plus Compressed Migration: an Integrated Solution to Parallel Simulations' Data Transport Needs", *Proceedings of the 16th International Conference on Supercomputing*, ACM Press, 2002, pp. 156-166, New York, New York, USA.

Mache, J. et al., "The Impact of Spatial Layout of Jobs of Parallel I/O Performance", *Proceedings of the 6th Workshop on I/O in Parallel and Distributed Systems*, ACM Press, 1999, pp. 45-56, USA Madhyastha, T. et al., Informed Prefetching of Collective Input/Output Requests, *Proceedings of the 1999 ACM/IEEE Conference on Supercomputing*, ACM Press, 1999, pp. 1-16; USA.

Moore, J.A. et al., "Efficient Data-Parallel Files via Automatic Mode Detection", *Proceedings of the 4th Workshop on I/O in Parallel and Distributed Systems*, ACM Press, 1996, pp. 1-14, USA.

Nieuwejaar, N. et al., "Perfomance of the Gallery Parallel File System", *Proceedings of the 4th Workshop on I/O in Parallel and Distributed Systems: Part of the Federated Computing Research Conference*, ACM Press, 1996, pp. 83-94, USA.

No, J. et al., "Integrating Parallel File I/O and Database Support for High-Performance Scientific Data Management", *Proccedings of the 2000 ACM/IEEE Conference on Supercomputing (CDROM)*, IEEE Computer Society, pp. 1-13, USA.

Park, Y. et al., "Virtual Memory Versus File Interfaces for Large, Memory-Intensive Scientific Applications", *Proceedings of the 1996 ACM/IEEE Conference on Supercomputing (CDROM)*- vol. 00 Supercomputing '96, ACM Press, IEEE Computer Society, 1996, pp. 1-20.

Purakayastha, A. et al. "ENWRICH: A Compute-Processor Write Caching Scheme for Parallel File Systems", *Proceedings of the 4th Workshop on I/O in Parallel and Distributed Systems*, ACM Press, 1996, pp. 55-68.

Shen, X, et al., "A Novel Application Development Environment for Large-Scale Scientific Computations", *Proceedings of the 14th International Conference on Supercomputing*, Acm Press, 2000, pp. 274-283, USA.

Shuf, Y. et al., "Characterizing the Memory Behavior of JAVA Workloads: A Structured View and Opportunities for Optimization"; *Proceedings of the 2001 ACM SIGMETRICS International Conference on Measurement and Modeling of Computer Systems SIGMETRICS '01*, ACM Press, 2001, vol. 29 No. 1, pp. 194-205.

Steenkiste, P. et al. , "Architecture and Evaluation of a High-Speed Networking Subsystem for Distribution-Memory Systems", ACM SIGARCH Computer Architecture News, *Proceedings of the 21st Annual International Symposium on Computer Architecture ISCA '94*, IEEE Computer Society Press, ACM Press, 1994, vol. 22 No. 2, pp. 154-163.

Sturtevant, J. et al., "PDS/PIO: Lightweight Libraries for Collective Parallel I/O", *Proceedings of the 1998 ACM/IEEE Conference on Supercomputing (CDROM)*, IEEE Computer Society, 1998, pp. 1-13.

Thakur, R. et al., "A Case for Using MPI's Derived Datatypes to Improve I/O Performance", *Proceedings of the 1998 ACM/IEE Conference on Supercomputing(CDROM)*, IEEE Computer Society, 1998, pp. 1-14.

Thakur, R. et al., "Compilation of Out-of-Core Data Parallel Programs for Distributed Memory Machines", *ACM SIGARCH Computer Architecture News*, ACM Press, vol. 22 Issue 4, 1994, pp. 23-28.

Thakur, R. et al., "On implementing MPI-IO Portably and with High Performance", *Proceedings of the 6th workshop of I/O in Parallel and Distributed Systems*, ACM Press, 1999, pp. 23-32, USA.

Thakur, R., et al., "Compiler and Runtime Support for Out-of-Core HPF Programs", *Proceedings of the 8th International Conference on Supercomputing*, 1994 ACM Press, pp. 382-391.

Vitter, J., External Memory Algorithms and Data Structures: Dealing with Massive Data; *ACM Computing Surveys (CSUR)*, vol. 33 No. 2, pp. 209-271, 2001.

Wang, Y. et al., "Profile-Guided I/O Partitioning", *Proceedings of the 17th Annual International Conference on Supercomputing*, ACM, 2003, pp. 252-260, USA.

Wu, J. et al., "Placement of I/O Servers to Improve Parallel I/O Performances on Switch-Based Clusters", *Proceedings of the 17th Annual International Conference on Supercomputing*, ACM Press, 2003, pp. 244-251, USA.

Zhou, Y. et al., "Thread Scheduling for Out-of-Core Applications With Memory Server on Multicomputers", *Proceedings of the 6th Workshop on I/O in Parallel and Distributed Systems*, ACM Press, 1999, pp. 57-67, USA.

\* cited by examiner

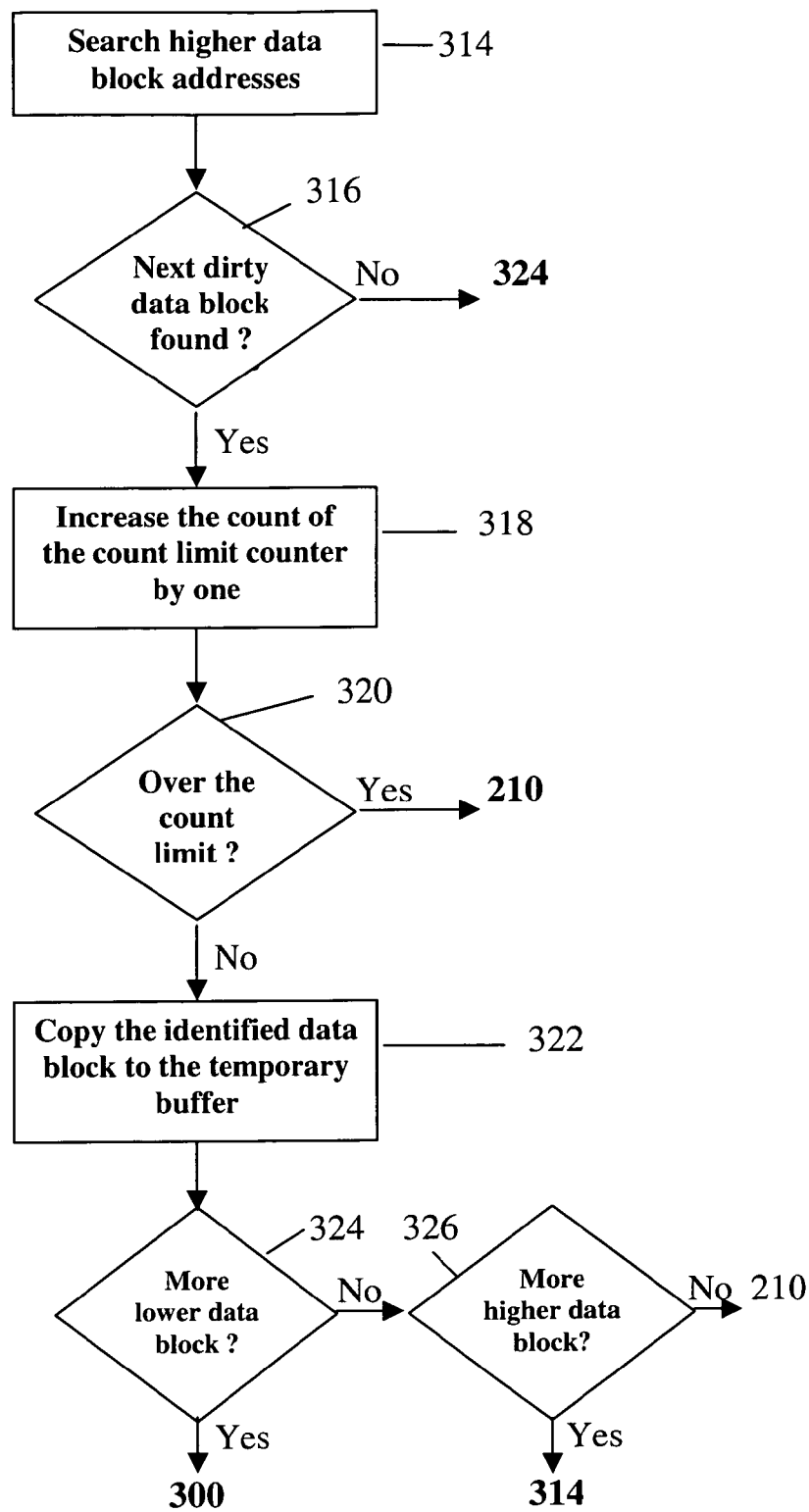
Fig. 3 (continue)

REDUCING DISK IO BY FULL-CACHE WRITE-MERGING

BACKGROUND AND SUMMARY

The invention relates to computer systems, and more particularly to a method and mechanism for reducing disk input/output operations (IOs) of a computing system by coalescing writes.

Storing and retrieving large amounts of data form some of the most important functions of today's computers. Database systems, such as an online transaction processing ("OLTP") system, are examples of computing applications that retrieve and store large quantities of data in a computing system. Database systems have performed these functions very successfully, creating the ability to retrieve data at speeds and quantities previously unimagined, and bestowing an unprecedented level of access to information. The success of such systems has unleashed a demand for even faster and more efficient systems that process even greater quantities of data.

Many large-scale computing systems perform immense numbers of input/output operations (IOs), such as reads and writes, on the systems' storage disks. It is well-known that much of the time spent by an application in performing an IO operation is in moving a disk head to an appropriate location (i.e., the location of a data block) on a disk of the system. The time spent in moving the disk head to a particular data block location on the disk is referred to a seek time. Conventionally, IOs are executed as single-block reads or writes from/to the disks of the system. Since many computing systems, e.g., database systems, constantly perform large numbers of read and write IOs on the disks, these systems accordingly spend a significant portion of their execution time in moving the disk heads to appropriate locations on the corresponding disks.

Memory buffers are often used to cache data to improve a system's data access performance. However, if the data within the memory buffer is modified, those modifications must be reconciled at some point with its corresponding data persistently stored in the system storage disks. Several approaches can be taken with respect to the timing to reconcile these changes between the memory buffer and the system disks. One strategy is to flush the "dirty" or modified write buffers to disk after each and every modification within the buffer cache. This type of approach adopts a "no-wait" policy that causes changes in the write buffer caches to be immediately made to the disks. This "no-wait" approach, however, is generally quite inefficient because of the large frequency of small IOs that must be performed.

As a result, some database/computer systems that handle large amounts of data instead adopt a "delay-write" approach which accumulates several data changes in the write buffer caches before flushing to disk. Several approaches can be implemented for the delay-write strategy. In one approach, the timing of the delayed writes are planned to institute checkpointing for the system memory/storage system. In another approach, an aging policy can be established to performed the delayed writes of the buffer cache.

A system that adopts the "delay-write" approach nonetheless still faces the problem of spending too much of its execution time in moving the disk heads to appropriate locations on the disks of the database system. Several approaches have been used to tackle this problem in order to sustain a high IO throughput for the system. One approach is to include a large number of disks in the system and then store data across these disks. Storing data in different disks allows many IOs to be executed in parallel. As a result, the IO throughput and the peak performance of the system will be increased. Use of such a large number of disks, however, adds to the cost of the system.

Another approach is to create a log-structured file system. This approach requires that all writes are appended at the end of a log file. Accordingly, this approach tends to store the data in a same disk of the system. Executing a write IO by the database system with the log-structured file system therefore stores data in the disk with minimal disk head movements. However, the log-structured file system has many disadvantages. For example, it is very complicated to implement a log-structured file system in a database. Costs in designing and implementing such a complex database will be greatly increased. Moreover, a log-structured file system generally penalizes the performance of the disk reads of the system. The reason the performance is penalized is because in a database system with a log-structured file system, locations of data blocks in the disks are not fixed. As a result, additional lookup operations are also required to determine the exact locations of the data blocks.

Accordingly, the present invention provides an improved method, mechanism, and system for reducing disk head movements of a computer system, such as a database system, when performing input and/or output operations (IOs). In one embodiment, data blocks in a buffer cache to be written into a disk of a computer system, such as a database system, are coalesced so that they can be written into the disk by a single write IO. When a write command is issued by the system to write an identified data block from the buffer cache to disk, the system will search the buffer cache for additional dirty data blocks that have addresses adjacent to the identified data block. The search space is the entire buffer cache. The identified data block and its adjacent data blocks which have been found are coalesced and written with the same IO operation. As a result, the IO throughput and performance of the computer system can be improved.

The write coalescing process in one embodiment is performed based on physical locations of the data blocks to be stored in the disk of the computer system. Writing the coalesced data blocks into the disk with a single write IO reduces the disk head movements of the computer system. Fewer disk head movements also mean that fewer disks are required for the computer system while maintaining a high IO throughput and high peak performance. This approach therefore provides a simple and effective method that improves the IO throughput and performance for the compute system without requiring any changes to disk space and storage management of the computer system.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides improved methods, mechanisms, and systems for reducing disk head movements of a computer system, such as a database system, when performing input and/or output operations (IOs). For the purpose of illustration, the following description will be made with respect to a database system. it is noted, however, that the concepts described herein are equally applicable to other types of computing systems and applications, e.g., operating systems, and are therefore not to be limited to database systems.

In one embodiment, data blocks in a buffer cache waiting to be written into a disk of a computer system, such as a database system, are coalesced so that they can be written into the disk by a single write IO. The write coalescing process is performed based on physical locations of the data blocks to be stored in the disk of the computer system. Writing the coalesced data blocks into the disk with a single write IO reduces the disk head movements of the computer system. Fewer disk head movements also mean that fewer disks are required for the computer system while maintaining a high IO throughput and high peak performance.

In a process according to an embodiment, a database system identifies dirty data blocks with consecutive data block addresses in a buffer cache of the database system. A data block is designated dirty if data in the data block has been changed but has not yet been persistently written into a corresponding data block of a disk of the database system. In this embodiment, data of these identified dirty data blocks are copied to a temporary storage location, such as a temporary buffer cache. The database system also includes a counter to track the number of the data blocks copied to the temporary storage location. After an appropriate condition is met, such as all the adjacent dirty data blocks are identified or the number of the data blocks in the temporary storage location reaches a predetermined upper limit, whichever comes first, these dirty data blocks are written to the disk of the database system together. Alternatively, the multiple blocks can be written out to disk without requiring a temporary buffer cache, e.g., some operating systems provide systems calls to perform gather writes which can write non-contiguous locations in memory to a contiguous location on disk.

Figure 1A:
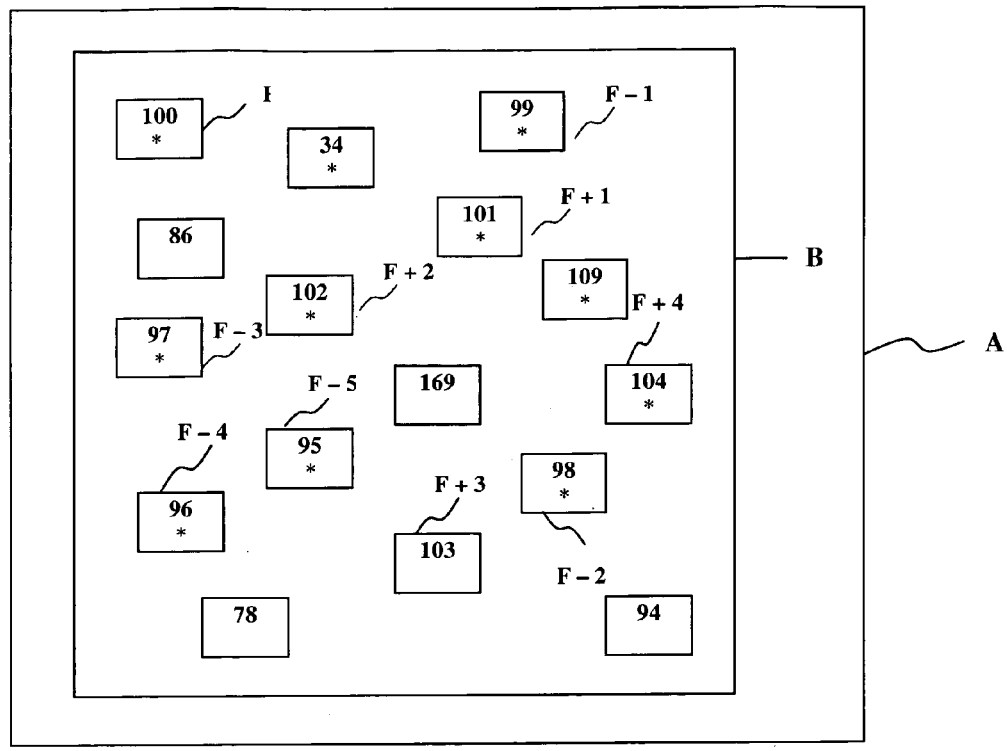
FIG. 1A shows a buffer cache B of a database system A to illustrate an embodiment of the present invention. Each box represents a data block. The Arabic numerals inside the boxes represent the addresses of the data block. An asterisk inside the box indicates the data block is designated dirty. The letters adjacent to and pointing to the boxes represent reference characters.

FIG. 1A illustrates a plurality of data blocks (i.e., buffers) in a buffer cache B of a database system A in accordance with an embodiment of the present invention. Typically, a database system has at least one buffer cache or pool that may contain data blocks for temporarily storing data during operations of the database system. Each of the data blocks in the buffer cache has a unique data block address. The data block addresses indicate destinations (i.e., a plurality of corresponding data blocks in the disk) to which data in the buffer cache's data blocks will be written, respectively. For illustrative purposes, the data blocks shown in FIG. 1A have data block addresses 100, 86, 97, . . . , etc.

According to the present embodiment, whenever a write command is issued by the database system A to write a data block F with a data block address 100 in the buffer cache B to a disk E, the database system A will search the buffer cache B for additional dirty data blocks that have addresses adjacent to the data block F with the address 100. In this embodiment, the search space is the entire buffer cache. Various approaches can be taken to search the buffer cache, e.g., using a hashing approach.

In one embodiment, the search is conducted alternatively on the lower data block address side and the higher data block address side until the search reaches a not dirty data block respectively at the lower and higher data block address sides or until it reaches the predetermined upper limit of the number of the coalesced data blocks, whichever comes first. In other words, when a data block F with the data block address 100 is to be written to the disk E, a set of data blocks in the buffer cache B that would form a contiguous space on the disk E with a range that contains the address 100 is identified. These adjacent data block include, for example, F–n, F–(n–1), . . . , F–2, F–1 for the lower data block address side, and F+1, F+2, . . . , F+m for the higher data block address side.

The predetermined upper limit sets a maximum of a combined value of n and m. For instance, if the predetermined upper limit is set to 7, the combined value of n and m (i.e., n+m+1) can only be 7 or less. The predetermined upper limit is set to allow the database system A to perform most efficient write IOs. Alternatively, the predetermined upper limit can be set by the database system A's operating system, which may have a specific limit on the size of an individual write.

In another embodiment, the search is conducted along a single direction at either the lower or higher data block address side until the search reaches a not dirty data block respectively at the lower and higher data block address sides or until it reaches the predetermined upper limit of the number of the coalesced data blocks, whichever comes first. If the not dirty data block is reached before the upper limit, then the search continues in the other direction from the data block address until either a not dirty data block is reached or until it reaches the predetermined upper limit of the number of the coalesced data blocks, whichever comes first.

In accordance with an embodiment, when a write command is issued to write the data block F in the buffer cache B to the disk E, the database system A first copies the data block F to a temporary location, such as a buffer C, of the database system A. A count of a count limit counter G is also increased from zero to one. Thereafter, the database system A searches for adjacent dirty data blocks to be written to the disk E. In an embodiment, the database system begins its search by looking for a data block F–1 at a next lower data block address 99. Then the search continues to look for a data block F+1 at a next higher data block address 101. Thus, the data block search according to the embodiment is conducted alternatively on opposite sides of the lower data block addresses and the higher data block addresses. In other embodiments, the database system A can first search the higher data block address side before it searches the lower data block address side, or it can search for all the adjacent dirty data blocks at one of the data block address sides (e.g., data blocks F−1, F−2, F−3, . . . , etc.) before it moves on to search for adjacent dirty data blocks on the other data block address side (e.g., data blocks F+1, F+2, F+3, . . . , etc.).

When the next lower adjacent data block F−1 is found and determined dirty, that next adjacent lower data block is copied to the temporary buffer C and the count of the count limit counter G is increased by one (i.e., from 1 to 2). Thereafter, the database system A continues it search to find another adjacent data block in the buffer cache B on the opposite data block address side. If another adjacent data block, e.g., the data block F+1, is found and determined dirty, that another adjacent dirty data block is copied to the temporary buffer C and the count of the count limit counter G is again increased by one. After that, the database system A keeps searching alternatively for additional adjacent dirty data blocks in the buffer cache B on opposite data block address sides. When the database system A can not find a next adjacent data block or the next adjacent data block is determined not dirty, the database system A stops searching for any new data blocks in that direction. For example, if the data block F+3 is not found or is determined not dirty, the data block F+3 will not be copied to the temporary buffer C and the database system A will not search further for any additional data blocks at higher data block addresses (i.e., the data blocks F+4, F+5,. . ., etc.). The search will, however, continue in the opposite direction until no adjacent dirty data block is found, or until the count of the count limit counter G reaches the predetermined upper limit.

Figure 1B:
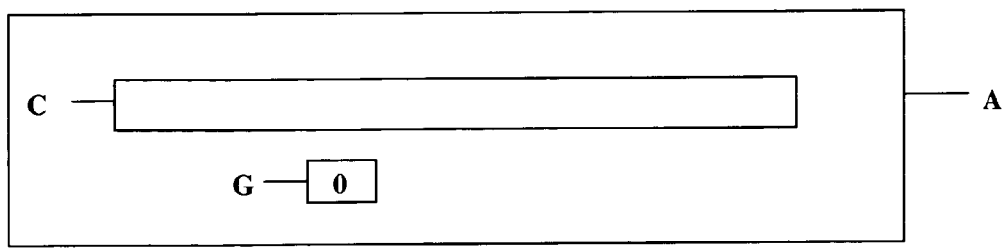
FIG. 1B shows an empty temporary buffer C and a counter G of the database system A.
Figure 1C:
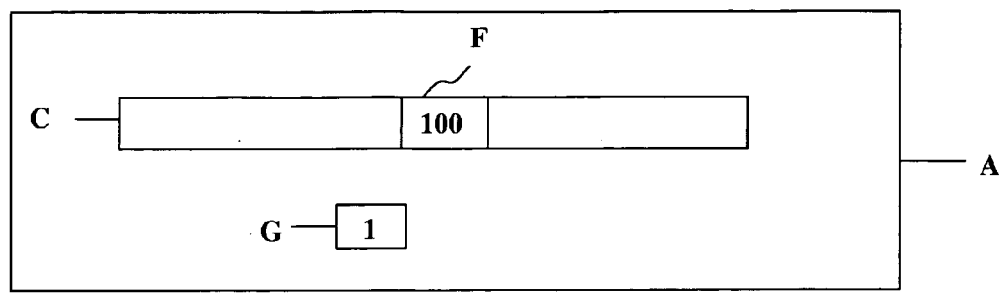
FIGS. 1C–1I show the temporary buffer C gradually filled with data blocks of adjacent data block addresses according to the embodiment of the present invention.
Figure 1D:
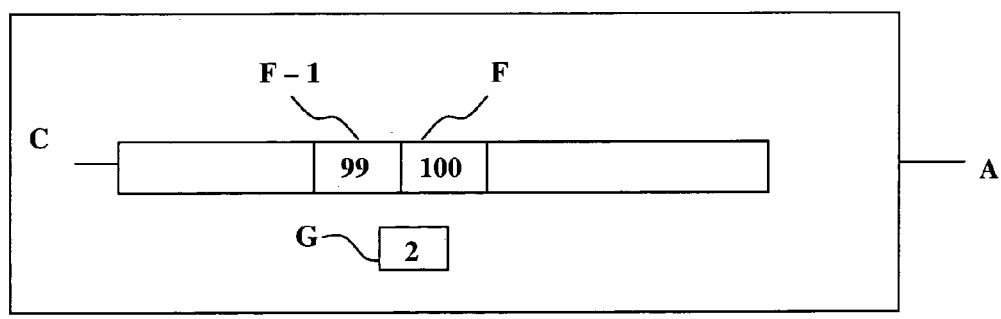
Figure 1E:
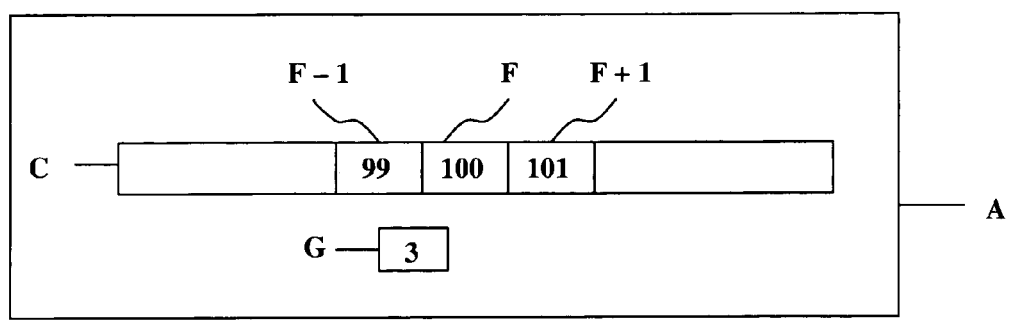
Figure 1F:
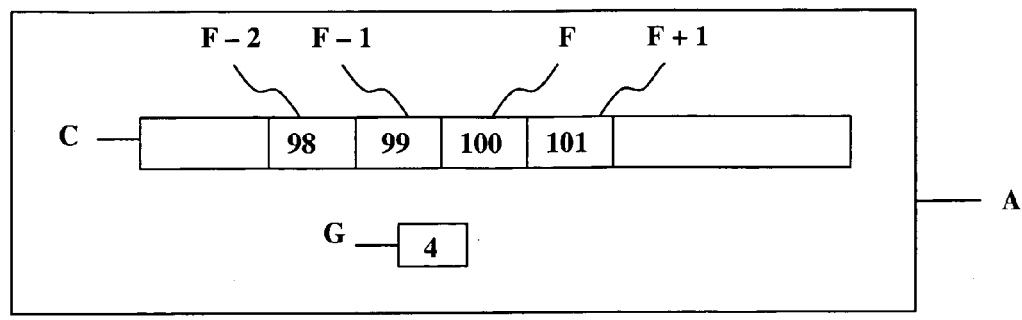
Figure 1G:
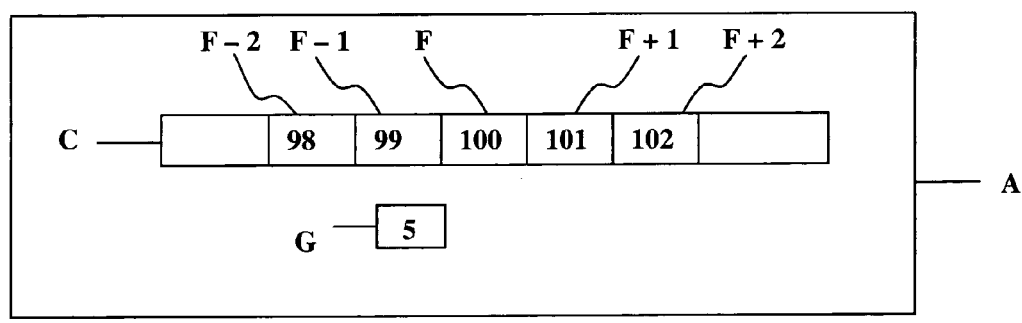
Figure 1H:
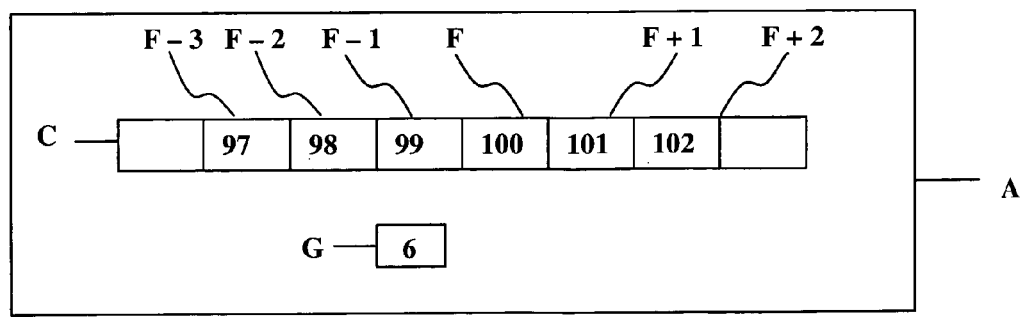
Figure 1I:
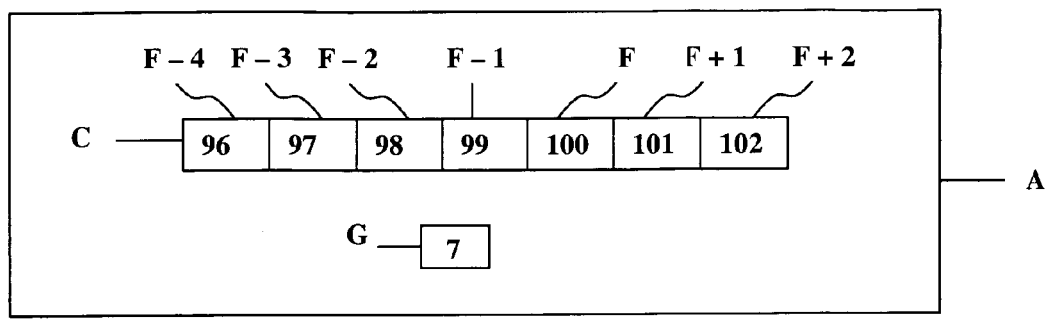
Figure 1J:
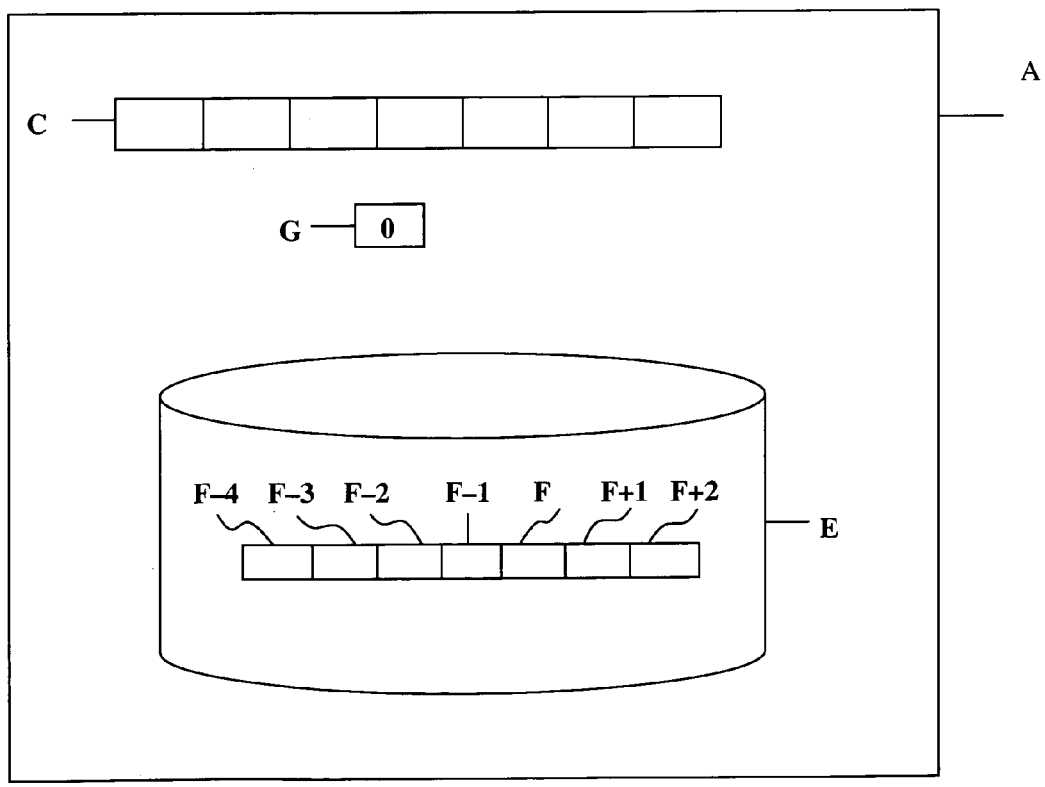
FIG. 1J shows the buffer C, the counter G and a disk E after the data blocks of adjacent data block addresses are written into the disk E.

An example illustrating an embodiment of the present invention is shown in FIGS. 1A–J. As shown in FIGS. 1A–B, the database system A comprises a buffer cache B with a plurality of data blocks waiting for being written into the disk E, a buffer C, and a count limit counter G. Some of the data blocks in the buffer cache B have an asterisk * included in data block boxes therein, respectively. This asterisk * indicates that these data blocks are designated as dirty data blocks. Initially, the count of the count limit counter G is reset to zero. When the write command is issued to write the data block F (i.e., the data block with a data block address 100) into the disk E, the database system A copies the data block F to the buffer C and the count of the count limit counter G is increased to 1, as shown in FIG. 1C. Thereafter, the database system A continues to alternatively search the buffer cache B on the lower and higher data block address sides for additional adjacent dirty data blocks until no more adjacent dirty data block is found at both data block address sides or until the count of the count limit counter G reaches the predetermined upper limit, whichever occurs first. FIG. 1D shows that a first lower dirty data block F−1, i.e., at data block address 99, is found and copied into the buffer C and the value of the count limit counter G is increased to 2, and FIG. 1E shows that a first higher dirty data block F+1, i.e., at data block address 101, is found and copied into the buffer C and the value of the count limit counter G is increased to 3. Similarly, FIGS. 1F–H show that two more lower dirty data blocks (i.e., data blocks F−2 and F−3 at addresses 98 and 97 respectively) and one more higher data block F+2 (i.e., a data block F+2 at address 102) are successively found and copied into the buffer C and the count of the count limit counter G is correspondingly increased from 3 to 6. Thereafter, the database system A searches for a data block F+3 at address 103. Since the data block F+3 is not dirty, the data block F+3 at address 103 will not be copied into the buffer C and the database system A will stop searching for additional data blocks on the higher data block address side (i.e., no more search for data blocks at upper addresses 104, 105, . . ., etc., even though some of these data blocks exist and are dirty). The database system A, however, continues its search on the lower data block address side. FIG. 1I shows that the data block F−4 at address 96 is found and determined dirty and is copied into the buffer C. The value of the count limit counter G is also increased to 7. If the predetermined upper limit is set to 7, the database system A will then stop searching for any additional data blocks in the buffer cache B. As such, although the buffer cache B still has an adjacent dirty data block F−5 at address 95, that dirty data block F−5 at address 95 will not be copied to the buffer C and thus will not be written to the disk E together with those previously identified dirty data blocks at addresses 96–102. FIG. 1J shows the buffer C, the counter G and a disk E after the data blocks of adjacent data block addresses are written into the disk E. Note that after the data blocks are written to the disk, the counter G is reset and contains the value of zero, and the data originally contained in buffer C are flushed.

In a typical system, to prevent inconsistencies from occurring to the data when a data block is being written to disk, that block is exclusively "locked" to prevent other entities from simultaneously writing/accessing to the data block during the write. The drawback to this type of locking is that it serializes access to the disk blocks being written. This reduces the available concurrency and increases the inefficiency of the system.

According to one embodiment, the present invention adopts a "write cloning" technique to further increase the efficiency of resource usage in the system. With the write cloning technique, when a data block is identified to be written to disk, a copy of that data block is created at another location in memory. One copy of the data block (e.g., the original copy) is locked and is written to disk. However, the other copy is made available to be accessed by other entities in the system, even during the write operation for its other copy. As a result, these copied data blocks (buffers) are free for future updates by processes of the database system even though the data originally from these data blocks may not yet be actually written to the disk E. And writes will accordingly not be unduly blocking other operations of the database system. Efficiency of the database system is therefore further improved by adopting this "write cloning" technique. It is noted that the "write-cloning" technique described herein can be applied to any computer or computing systems, including any database systems.

In another embodiment, however, data block locations in the buffer cache B of those data blocks copied into the buffer C remain marked as dirty. In accordance with this embodiment, these data blocks in the buffer cache B are still unavailable and not accessible to future updates by the database system until they are actually written into the disk E.

Figure 2:
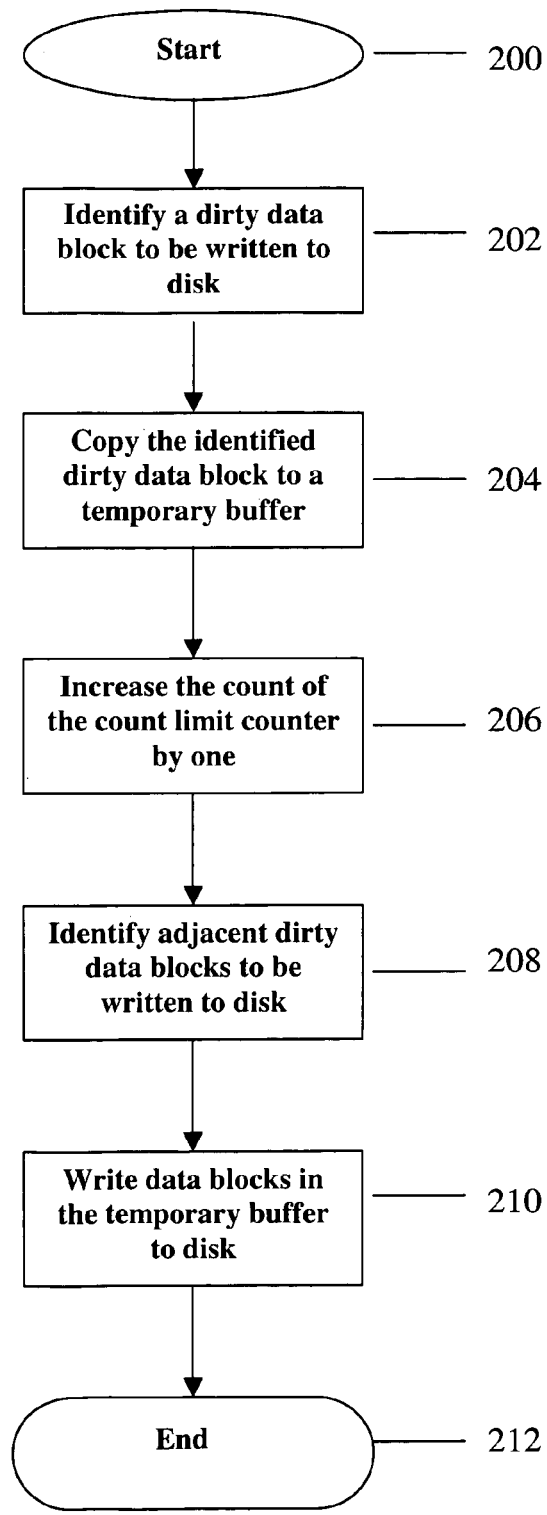
FIG. 2 shows a flowchart of a process according to an embodiment of the present invention.

FIG. 2 illustrates a main flowchart of a process for coalescing writes according to one embodiment of the present invention. Box 200 represents that a write command is issued by the database system A to write data in a data block (e.g., the data block F at address 100) to the disk E. At 202, the database system A searches the buffer cache B to identify the data block F at address 100 and confirms that the data block F is dirty and ready to be written to the disk E. Thereafter, at 204, the data block F is copied to the buffer C of the database system A, as shown in FIG. 1C. The database system A then marks the data block F in the buffer cache B as not dirty after it finishes copying the data block F to the buffer C. After it is marked not dirty, the data block location of the data block F in the buffer cache B becomes unlock and ready for an update by the database system. Namely, the data block F in the buffer cache B needs not wait until its data is actually written into the disk E before it can be updated by a process of the database system A. As such, the performance of the database system A is improved and the database system's resources, e.g., the buffer cache B, can be more efficiently used.

At 206, the database system A increases a count of a count limit counter G by one, i.e., from zero to one. As mentioned, a predetermined upper limit can be set for the count of the count limit counter G. In one embodiment, the upper limit is set to 4 that allows 4 data blocks in the buffer cache B to be written to the disk E in a single write. Since each data block contains 2 kb of data, this embodiment allows 8 kb of data to be written to the disk E in a single write. In other embodiments, the predetermined upper limit can be set to as low as 2 (4 kb), as high as 32 (64 kb), or even higher.

After data of the data block F at address 100 is copied to the temporary buffer C, the database system A searches the buffer cache B for additional dirty data blocks with data block addresses adjacent to the data block F, as shown in box 208 of FIG. 2. Subsequently, at 210, the database system A writes all data blocks in the buffer C into the disk E with a single write after all the adjacent dirty data blocks are found or after the count of the count limit counter G reaches the predetermined upper limiter. Thus, the present invention needs just one write IO to write all these identified adjacent dirty data blocks instead of N (N=n+m+1) individual write IOs for writing each of the data blocks in the buffer cache B. Furthermore, also at 210, the count of the count limit counter G is reset to zero after the data blocks in the buffer C are written into the disk E.

Figure 3:
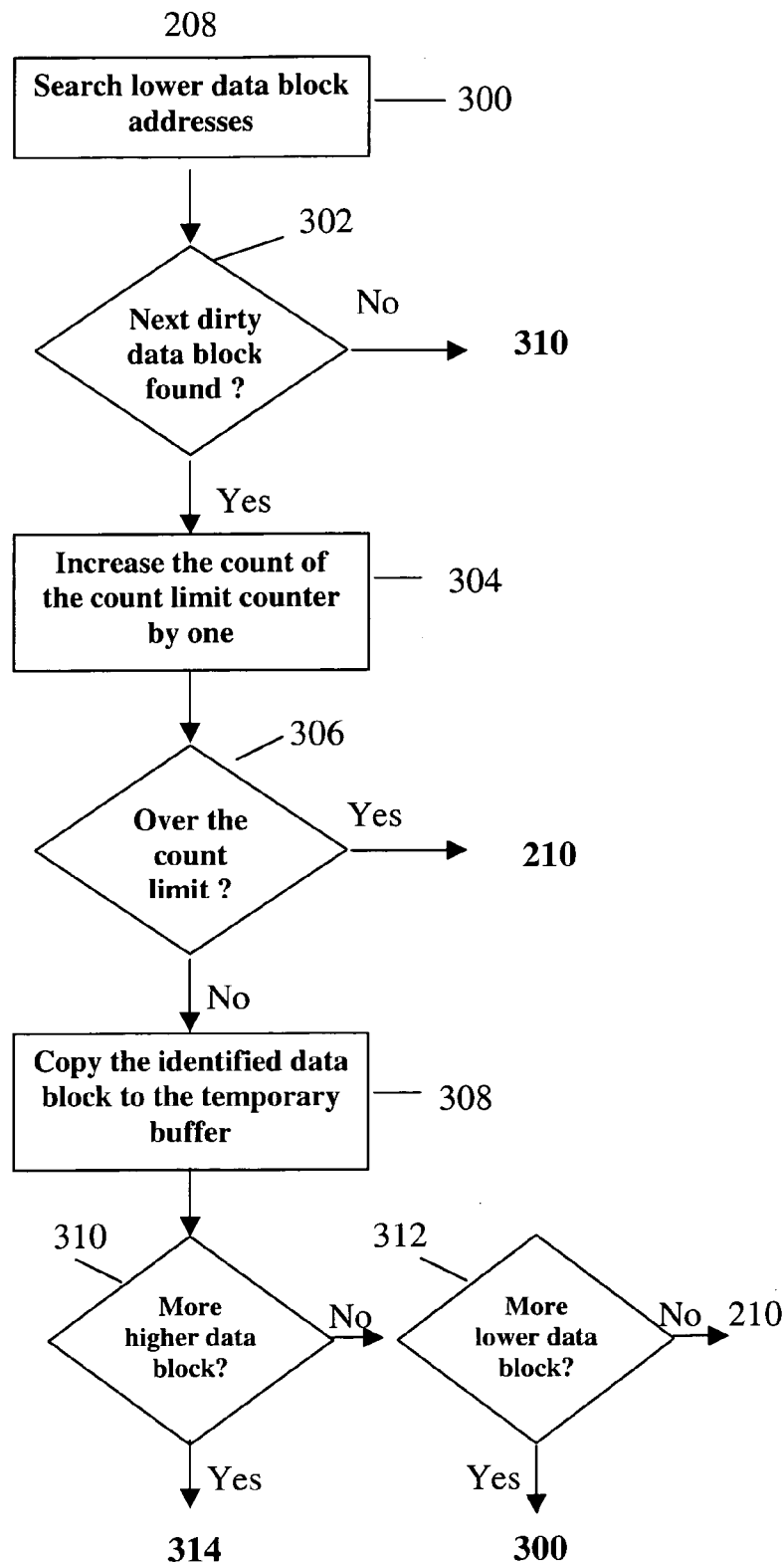
FIG. 3 shows a flowchart of a process for identifying lower and higher adjacent dirty data blocks according to an embodiment of the invention.

FIG. 3 shows a flowchart of a process that illustrates detailed actions in performing the box 208 of FIG. 2, according to one embodiment of the present invention. Specifically, FIG. 3 shows detailed actions of box 208 that identifies adjacent dirty data blocks to be written to the disk E. At 300, the database system A starts its search by looking for a next adjacent dirty data block on the lower data block address side, i.e., the data block with the data block F−1. If the next dirty data block is found at 302, the process goes to box 304. Otherwise, a first flag is set to signal that no more lower adjacent data block is to be identified and the process goes to box 310. At 304, the value of the count limit counter G is increased by one. The database system A then checks, at box 306, whether the value is over the predetermined upper limit. If the count is over the predetermined upper limit, the process continues to box 210. If not, the process goes to box 308. At 308, the currently identified next dirty data block (e.g., the data block F−1) is copied to the buffer C. And the database system A marks the data block F−1 in the buffer cache B as not dirty after it finishes copying the data block F−1 to the buffer C.

After data of the previously identified data block is copied to the buffer C, the database system A checks at box 310 whether there is a second flag that signals no more higher adjacent dirty data block is to be identified. If there is such a second flag, the process goes to box 312. Otherwise, the process goes to box 314 to search for the next adjacent dirty data block at the higher data block address side (i.e., the data block F+1). At 312, the process checks whether the first flag is set by action 302 that signals no more lower adjacent dirty data block is to be identified. If the first flag is set, the process goes to box 210. If there is no such first flag set, the process then goes to box 300 to continue searching for the next lower adjacent dirty data block (e.g., the data block F−2).

At 314, the process searches for the next higher adjacent dirty data block (i.e., the data block F+1). At 316, the process determines whether the next higher adjacent dirty data block is found. If the next higher dirty data block is found, the process goes to box 318. If not, the second flag is set to signal that no more higher adjacent dirty data block is to be identified and the process goes to box 324. At 318, the count of the count limit counter G is increased by one. The database system A then checks at box 320 whether the count is over the predetermined upper limit or not. If the count is over the predetermined upper limit, the process goes to box 210. If not, the process continues to box 322. At 322, the identified next higher dirty data block (e.g., the data block F+1) is copied to the buffer C. And the database system A marks the data block F+1 in the buffer cache B as not dirty after it finishes copying the data block F+1 to the buffer C. After the next higher dirty data block is copied to the temporary buffer C, the database system A checks at box 324 whether the first flag is set by box 302 that signals no more lower adjacent dirty data block is to be identified. If there is no such a first flag, the process goes to box 300 to continue searching for the next lower adjacent dirty data block at the lower data block address side (e.g., the data block F−2). If instead the first flag is set, the process goes to box 326 to check whether the second flag is set by box 316 that signals that no more higher adjacent dirty data block is to be identified. If the second flag is set by box 316, the process goes to box 210. If not, the process goes to box 314 to continue to search for the next higher dirty data block (e.g., the data block F+2).

It is noted that, in another embodiment of the present invention, actions performed in box 204 of FIG. 2 are optional. More specifically, multiple steps of copying identified data blocks to a temporary buffer can be saved for a certain database system if the operation system of such a database system allows for writing multiple data blocks to the disk with a single write command. For instance, the Unix operating system has a "gather write" function that allows the execution of a single write command to write multiple data blocks in a buffer into a disk. As a result, if the database system is run by such an operating system, there may be no need to copy identified dirty data blocks to the temporary buffer C by actions in boxes 204, 308, and 322 before the database system can write these identified dirty data blocks into the disk.

The present invention provides several advantages over the conventional approaches. For example, the database system according to the present invention uses coalescing writes to reduce disk head movements of the database system. No additional disks are required to improve the IO performance of the current database system. Therefore, the present invention allows for a simple and effective implementation without requiring any changes to disk space and storage management in the database system.

Figure 4:
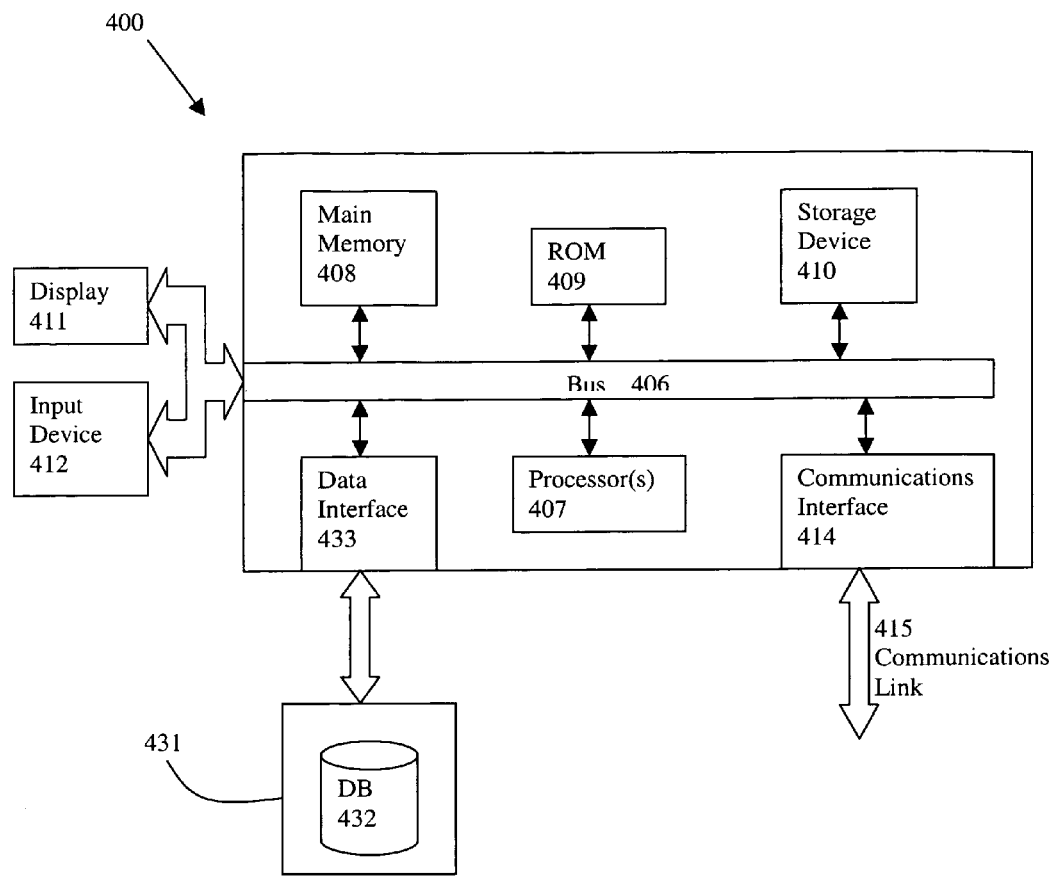
FIG. 4 shows a diagram of a computer system with which the present invention can be implemented.

Execution of sequences of actions and/or instructions required to practice the invention may be performed in embodiments of the invention by a computer system 400 as shown in FIG. 4. As used herein, the term computer system 400 is broadly used to describe any computing device that can store and independently run one or more programs. In an embodiment of the invention, execution of the sequences of actions and/or instructions required to practice the invention is performed by a single computer system 400. According to other embodiments of the invention, two or more computer systems 400 coupled by a communication link 415 may perform the sequence of actions required to practice the invention in coordination with one another. In order to avoid needlessly obscuring the invention, a description of only one computer system 400 will be presented below; however, it should be understood that any number of computer systems 400 may be employed to practice the invention.

Each computer system 400 may include a communication interface 414 coupled to the bus 406. The communication interface 414 provides two-way communication between computer systems 400. The communication interface 414 of a respective computer system 400 transmits and receives signals, e.g., electrical, electromagnetic or optical signals, that include data streams representing various types of information, e.g., instructions, messages and data. A communication link 415 links one computer system 400 with another computer system 400. A computer system 400 may transmit and receive messages, data, and instructions, including program, i.e., application, code, through its respective communication link 415 and communication interface 414. Received program code may be executed by the respective processor(s) 407 as it is received, and/or stored in the storage device 410, or other associated non-volatile media, for later execution.

In an embodiment, the computer system 400 operates in conjunction with a data storage system 431, e.g., a data storage system 431 that contains a database 432 that is readily accessible by the computer system 400. The computer system 400 communicates with the data storage system 431 through a data interface 433. A data interface 433, which is coupled to the bus 406, transmits and receives signals, e.g., electrical, electromagnetic or optical signals, that include data streams representing various types of signal information, e.g., instructions, messages and data. In embodiments of the invention, the functions of the data interface 433 may be performed by the communication interface 414.

Computer system 400 includes a bus 406 or other communication mechanism for communicating instructions, messages and data, collectively, information, and one or more processors 407 coupled with the bus 406 for processing information. Computer system 400 also includes a main memory 408, such as a random access memory (RAM) or other dynamic storage device, coupled to the bus 406 for storing dynamic data and instructions to be executed by the processor(s) 407. The main memory 408 also may be used for storing temporary data, i.e., variables, or other intermediate information during execution of instructions by the processor(s) 407. The computer system 400 may further include a read only memory (ROM) 409 or other static storage device coupled to the bus 406 for storing static data and instructions for the processor(s) 407. A storage device 410, such as a magnetic disk or optical disk, may also be provided and coupled to the bus 406 for storing data and instructions for the processor(s) 407. A computer system 400 may be coupled via the bus 406 to a display device 411, such as, but not limited to, a cathode ray tube (CRT), for displaying information to a user. An input device 412, e.g., alphanumeric and other keys, is coupled to the bus 406 for communicating information and command selections to the processor(s) 407.

According to one embodiment of the invention, an individual computer system 400 performs specific operations by their respective processor(s) 407 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 407. Such a medium may take many forms, including, but not limited to, non-volatile and volatile media. Non-volatile media, i.e., media that can retain information in the absence of power, include the ROM 409, CD ROM, magnetic tape, and magnetic discs. Volatile media, i.e., media that can not retain information in the absence of power, include the main memory 408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for reducing IOs by coalescing writes in a computer system, comprising:
   identifying, in a first storage location, a first data block to be written into a second storage location, the first data block having a first data block address and being associated with a first destination address;
   identifying, in the first storage location, an additional data block to be written into the second storage location, the additional data block having a second data block address and being associated with a second destination address;
   tracking a total number of the identified first and additional data blocks; and
   writing the identified first and additional data blocks to the second storage location according to the first and second destination addresses with a write operation, in which said first and additional data addresses constitute consecutive addresses and the first and additional destination addresses constitute consecutive addresses.

2. The method of claim 1, further comprising setting a predetermined upper limit for the total number of the identified first and additional data blocks, in which if the predetermined upper limit is met by the total number of the identified first and additional data blocks, the method stops identifying additional data blocks and writes the identified first and additional data blocks to the second storage location.

3. The method of claim 1, further comprising copying each of the identified first and additional data blocks to a temporary storage location, wherein writing the identified first and additional data blocks to the second storage location is accomplished by writing copies of the identified first and additional data blocks in the temporary storage location to the second storage location.

4. The method of claim 3, further comprising marking the identified first and additional data blocks in the first storage location not dirty each time after an identified data block is copied to the temporary storage location.

5. The method of claim 4 in which the temporary storage location is a temporary buffer cache.

6. The method of claim 1, wherein identifying additional data blocks comprises:
sequentially searching the first storage location to identify next data blocks with higher and lower data block addresses consecutive to the first data block address; and
determining whether an identified next data block is dirty, wherein if the identified next data block is not dirty, the method stops sequentially searching for new data blocks with data block addresses at a same data block address side to the data block address of the identified next data block.

7. The method of claim 6 in which sequentially searching the first storage location is conducted alternatively at the lower and higher data block address sides to the first data block address.

8. The method of claim 7 in which sequentially searching the first storage location begins by searching the next data block at the lower data block address side.

9. The method of claim 7 in which sequentially searching the first storage location begins by searching the next data block at the higher data block address side.

10. The method of claim 6 in which sequentially searching the first storage location comprises:
searching for all dirty next data blocks with consecutive data block addresses to the first data block address at one of the lower and higher data block address sides; and
searching for all dirty next data blocks with consecutive data block addresses to the first data block address at another one of the lower and higher data block address sides.

11. The method of claim 1 in which the first storage location is a buffer cache.

12. The method of claim 1 in which the second storage location is a disk.

13. The method of claim 1 in which the computer system is a database system.

14. The method of claim 1 further comprising:
copying the first and additional data blocks to form a copy of the first and additional data blocks; and
allowing other entities in the computer system to access the copy of the first and additional data blocks during the act of writing the first and additional data blocks.

15. The method of claim 1 wherein identifying the additional data blocks comprises:
sequentially searching the first storage location to identify next data blocks in the direction of either the higher or lower data block addresses consecutive to the first data block address.

16. The method of claim 15 wherein if an identified next data block is not dirty, sequentially searching in the opposite direction of either the higher or lower data block addresses consecutive to the first data block address.

17. The method of claim 1 in which the computer system comprises a database system.

18. The method of claim 1 in which the first storage location is a buffer cache, wherein the entire buffer cache is searched.

19. The method of claim 18 in which hashing is performed to search the entire buffer cache.

20. The method of claim 1, in which the first and second data block addresses are logical addresses.

21. The method of claim 1, in which the first and additional addresses are physical addresses.

22. A computer system, comprising:
means for identifying; in a first storage location, a first data block to be written into a second storage location, the first data block having a first data block address and being associated with a first destination address;
means for identifying, in the first storage location, an additional data block to be written into the second storage location, the additional data block having a second data block address and being associated with a second destination address;
means for tracking a total number of the identified first and additional data blocks; and
means for writing the identified first and additional data blocks to the second storage location according to the first and second destination addresses with a write operation, in which said first and additional data addresses constitute consecutive addresses and the first and additional destination addresses constitute consecutive addresses.

23. The computer system of claim 22, further comprising:
means for setting a predetermined upper limit of the total number of the identified first and additional data blocks, in which if the predetermined upper limit is met by the total number of the tracking means, the computer system stops identifying additional data blocks and immediately writes the identified first and additional data blocks to the second storage means.

24. The computer system of claim 22, further comprising:
temporary storage means for temporarily storing data in a third plurality of data blocks;
means for copying each of the identified first and additional data blocks to the temporary storage means; and
means for marking one of the identified first and additional data blocks in the first storage means not dirty after the one of the identified first and additional data blocks copied to the temporary storage means, in which the identified first and additional data blocks are written to the second storage means by copying the identified first and additional data blocks in the temporary storage means to the second storage means.

25. The computer system of claim 24, wherein the temporary storage means is a temporary buffer cache.

26. The computer system of claim 22, wherein said identifying means comprises:
means for sequentially searching the first storage means to identify the first data block and next data blocks with higher and lower data block addresses consecutive to the first data block address of the first data block; and
means for determining whether the an identified next data block is dirty, in which if the identified next data block is not dirty, the computer system stops sequentially searching for new data blocks with data block addresses on a same side of the first data block where the at least one next data block resides.

27. The computer system of claim 26, wherein the sequentially searching means searches the first storage means alternatively at the lower and higher data block address sides to the first data block address.

28. The computer system of claim 26, wherein the sequentially searching means searches the first storage means for all dirty data blocks with consecutive data block addresses to the first data block address at one of the lower and higher data block address side before it searches the first storage means for all dirty data blocks with consecutive data block addresses to the first data block address at another one of the lower and higher data block address sides.

29. The computer system of claim 22 in which the first storage means is a buffer cache.

30. The computer system of claim 22 in which the second storage means is a disk.

31. The computer system of claim 22 in which the computer system is a database system.

32. A computer program product comprising a computer-readable storage medium having executable code to execute a process for reducing IOs by coalescing writes in a computer system, the process comprising:

identifying, in a first storage location, a first data block to be written into a second storage location, the first data block having a first data block address and being associated with a first destination address;

identifying, in the first storage location, an additional data block to be written into the second storage location, the additional data block having a second data block address and being associated with a second destination address;

tracking a total number of the identified first and additional data blocks; and writing the identified first and additional data blocks to the second storage location according to the first and second destination addresses with a write operation, in which said first and additional data addresses constitute consecutive addresses and the first and additional destination addresses constitute consecutive addresses.

33. The computer program product of claim 32, in which the process for reducing IOs further comprises:

setting a predetermined upper limit of the total number of the identified first and additional data blocks, in which if the predetermined upper limit is met by the total number of the tracking means, the computer system stops identifying additional data blocks and writes the identified first and additional data blocks to the second storage location.

34. The computer program product of claim 32, in which the process for reducing IOs further comprises:

temporarily storing data in one or more third data blocks;

copying each of the identified first and additional data blocks to a temporary storage location; and marking one of the identified first or additional data blocks in the first storage location not dirty after the one of the identified first or additional data block is copied to a temporary storage location, in which the identified first and additional data blocks are written to the second storage location by copying the identified first and additional data block in the temporary storage location to the second storage location.

35. The computer program product of claim 34 comprising a computer usable storage medium having a executable code to execute a process for reducing IOs, in which said one or more third data blocks are stored in a temporary buffer cache.

36. The computer program product of claim 32 comprising a computer usable storage medium having a executable code to execute a process for reducing IOs, in which the steps of identifying data blocks further comprising:

sequentially searching the first storage location to identify the first data block and at least one next data block with higher and lower data block address consecutive to the first data block address of the first data block; and determining whether the an identified next data block is dirty, in which if the at least one next data block is not dirty, the computer system stops sequentially searching for new data blocks with data block addresses on a same side of the first data block where the at least one next data block resides.

37. The computer program product of claim 36, in which said step of sequentially searching the first storage searches the first storage location alternatively at the lower and higher data block address sides to the first data block address.

38. The computer program product of claim 36, in which said step of sequentially searching searches the first storage location for all dirty data blocks with data block addresses consecutive to the first data block address on one of the lower and higher data block address side before searching the first storage location for all dirty data blocks with data block addresses consecutive to the first data block address on another one of the lower and higher data block address sides.

39. The computer program product of claim 32, in which said first storage is a buffer cache.

40. The computer program product of claim 32, in which said second storage is a disk.

41. The computer program product of claim 32, in which said computer is a database system.

* * * * *